United States Patent
Tanaka et al.

(10) Patent No.: US 10,869,514 B2
(45) Date of Patent: Dec. 22, 2020

(54) ACRYLIC FIBER FOR ARTIFICIAL HAIR, METHOD FOR PRODUCING SAME, AND HEAD DECORATION ARTICLE CONTAINING SAME

(71) Applicant: KANEKA CORPORATION, Osaka (JP)

(72) Inventors: Takeshi Tanaka, Hyogo (JP); Sota Okumura, Hyogo (JP); Tomomichi Hashimoto, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 100 days.

(21) Appl. No.: 16/136,551

(22) Filed: Sep. 20, 2018

(65) Prior Publication Data

US 2019/0021425 A1 Jan. 24, 2019

Related U.S. Application Data

(63) Continuation of application No. PCT/JP2017/011685, filed on Mar. 23, 2017.

(30) Foreign Application Priority Data

Mar. 25, 2016 (JP) ................. 2016-062284

(51) Int. Cl.
| | | |
|---|---|---|
| *A41G 3/00* | (2006.01) | |
| *D01F 6/40* | (2006.01) | |
| *D01F 6/54* | (2006.01) | |
| *C08L 27/06* | (2006.01) | |
| *D01D 5/06* | (2006.01) | |
| *D01F 1/07* | (2006.01) | |

(52) U.S. Cl.
CPC ............ *A41G 3/0083* (2013.01); *C08L 27/06* (2013.01); *D01D 5/06* (2013.01); *D01F 6/40* (2013.01); *D01F 6/54* (2013.01); *C08L 2203/12* (2013.01); *D01F 1/07* (2013.01); *D10B 2321/101* (2013.01); *D10B 2503/08* (2013.01)

(58) Field of Classification Search
CPC .......... D10B 2321/101; D10B 2503/08; D01D 5/06; D01D 1/02; D01F 6/40; D01F 1/10; D01F 6/54; D01F 1/07; C08F 220/06; C08F 20/06; A41G 5/0006; A41G 5/004; A41G 5/0046; A41G 3/0083; A41G 3/00; C08L 27/06
USPC ................................. 528/321, 366; 428/357
See application file for complete search history.

(56) References Cited

U.S. PATENT DOCUMENTS

| | | | | |
|---|---|---|---|---|
| 3,862,070 A | * | 1/1975 | Fukushima ............. | C08L 33/20 524/140 |
| 2004/0074509 A1 | | 4/2004 | Murata et al. | |
| 2009/0243143 A1 | | 10/2009 | Zhang et al. | |
| 2017/0335491 A1 | * | 11/2017 | Yoshimura ................ | D01F 6/40 |

FOREIGN PATENT DOCUMENTS

| | | |
|---|---|---|
| CN | 100352978 A | 12/2007 |
| EP | 1367153 A1 | 12/2003 |
| EP | 2123805 A1 | 11/2009 |
| JP | S5994677 A | 5/1984 |
| JP | 2002-227018 A | 8/2002 |
| JP | 2002-227028 A | 8/2002 |
| JP | 2007-291571 A | 11/2007 |
| JP | 2010-512469 A | 4/2010 |
| JP | 2011-252251 A | 12/2011 |
| WO | 2012/043348 A1 | 4/2012 |

OTHER PUBLICATIONS

International Search Report issued in International Application No. PCT/JP2017/011685, dated May 16, 2017 (2 pages).
Office Action issued in Chinese Application No. 201780019843.8, dated Jun. 2, 2020 (19 pages).

* cited by examiner

*Primary Examiner* — Camie S Thompson
(74) *Attorney, Agent, or Firm* — Osha Bergman Watanabe & Burton LLP

(57) ABSTRACT

Modacrylic fibers for artificial hair include a modacrylic polymer; and a condensed phosphate. The modacrylic polymer includes 29.5 to 79.5% by mass of acrylonitrile, 20 to 70% by mass of vinyl chloride and/or vinylidene chloride, and 0.5 to 5% by mass of a sulfonic acid group containing vinyl monomer, with respect to a total mass of the modacrylic polymer. A content of the condensed phosphate in the modacrylic fibers is 0.05 to 0.57% by mass.

19 Claims, No Drawings

ACRYLIC FIBER FOR ARTIFICIAL HAIR, METHOD FOR PRODUCING SAME, AND HEAD DECORATION ARTICLE CONTAINING SAME

TECHNICAL FIELD

One or more embodiments of the present invention relate to modacrylic fibers for artificial hair that are made from a modacrylic polymer prepared by copolymerizing acrylonitrile and vinyl chloride and/or vinylidene chloride, that have good texture and gloss, and that reduce the generation of odorous components during heating. One or more embodiments of the present invention also relate to a method for producing the modacrylic fibers for artificial hair, and hair ornament products including the modacrylic fibers for artificial hair.

BACKGROUND

Conventionally, modacrylic fibers have been used as fibers for artificial hair because their texture, luster, and voluminousness are quite similar to those of human hair. For example, Patent Document 1 proposes artificial hair that uses fibers made from a modacrylic polymer containing 35 to 75% by mass of acrylonitrile, 25 to 65% by mass of a halogen-containing vinyl monomer such as vinyl chloride, and 0 to 10% by mass of a vinyl monomer copolymerizable with the acrylonitrile and the halogen-containing vinyl monomer. Patent Document 2 proposes artificial hair that uses fibers made from a modacrylic polymer containing 35 to 75% by mass of acrylonitrile, 25 to 65% by mass of vinyl chloride and/or vinylidene chloride, and 0 to 10% by mass of a vinyl monomer copolymerizable with the acrylonitrile and the vinyl chloride and/or the vinylidene chloride. Patent Document 3 proposes synthetic fibers for artificial hair made from a modacrylic polymer containing 30 to 80% by mass of acrylonitrile and 20 to 70% by mass of vinyl chloride and/or vinylidene chloride.

PATENT DOCUMENTS

Patent Document 1: JP 2002-227018 A
Patent Document 2: JP 2002-227028 A
Patent Document 3: WO 2012/043348

However, when modacrylic fibers are produced by wet spinning the modacrylic polymer prepared by copolymerizing acrylonitrile and vinyl chloride and/or vinylidene chloride as disclosed in Patent Documents 1 to 3, particularly by wet spinning a spinning solution in which the modacrylic polymer is dissolved in dimethyl sulfoxide, the dimethyl sulfoxide may remain in the resulting fibers. Therefore, if these fibers are heated in curl setting with hot water or an iron, or crimping with a gear crimper, the dimethyl sulfoxide within the fibers is decomposed to generate odorous components such as dimethyl sulfide and dimethyl disulfide.

SUMMARY

One or more embodiments of the present invention provide modacrylic fibers for artificial hair that are made from a modacrylic polymer prepared by copolymerizing acrylonitrile and vinyl chloride and/or vinylidene chloride, that have good texture and gloss, and that reduce the generation of odorous components during heating. One or more embodiments of the present invention also provide a method for producing the modacrylic fibers for artificial hair, and hair ornament products including the modacrylic fibers for artificial hair.

In one aspect, one or more embodiments of the present invention relate to modacrylic fibers for artificial hair made from a modacrylic polymer. The modacrylic polymer contains 29.5 to 79.5% by mass of acrylonitrile, 20 to 70% by mass of vinyl chloride and/or vinylidene chloride, and 0.5 to 5% by mass of a sulfonic acid group-containing vinyl monomer with respect to a total mass of the modacrylic polymer. The modacrylic fibers for artificial hair contain a condensed phosphate, and a content of the condensed phosphate in the modacrylic fibers for artificial hair is 0.05 to 0.57% by mass.

In one aspect, one or more embodiments of the present invention relate to a method for producing modacrylic fibers for artificial hair by wet spinning a spinning solution in which a modacrylic polymer is dissolved in an organic solvent. The modacrylic polymer contains 29.5 to 79.5% by mass of acrylonitrile, 20 to 70% by mass of vinyl chloride and/or vinylidene chloride, and 0.5 to 5% by mass of a sulfonic acid group-containing vinyl monomer with respect to a total mass of the modacrylic polymer. The organic solvent is dimethyl sulfoxide. The wet spinning includes at least a coagulation process, a water washing process, and a drying process. A condensed phosphate is applied to the water-washed modacrylic fibers before the drying process so as to obtain modacrylic fibers for artificial hair with a content of the condensed phosphate of 0.05 to 0.57% by mass.

In one or more embodiments, a content of phosphorus in the modacrylic fibers for artificial hair is preferably 0.0134 to 0.150% by mass. When 0.02 g of the modacrylic fibers for artificial hair are placed in a 20 mL vial and heated at 140° C. for 5 minutes, a concentration of dimethyl sulfide generated in the vial is preferably 10 ppm or less, and a concentration of dimethyl disulfide generated in the vial is preferably 5 ppm or less.

In one or more embodiments, the condensed phosphate is preferably at least one compound selected from the group consisting of pyrophosphate, tripolyphosphate, tetrapolyphosphate, trimetaphosphate, and tetrametaphosphate, and more preferably tripolyphosphate.

One or more embodiments of the present invention also relate to a hair ornament product including the modacrylic fibers for artificial. hair.

In one aspect, one or more embodiments of the present invention can provide modacrylic fibers for artificial hair that are made from a modacrylic polymer prepared by copolymerizing acrylonitrile and vinyl chloride and/or vinylidene chloride, that have good texture and gloss, and that reduce the generation of odorous components during heating. One or more embodiments of the present invention can also provide hair ornament products including the modacrylic fibers for artificial hair.

In one aspect, the production method of one or more embodiments of the present invention can provide modacrylic fibers for artificial hair that are made from a modacrylic polymer prepared by copolymerizing acrylonitrile and vinyl chloride and/or vinylidene chloride, that have good texture and gloss, and that reduce the generation of odorous components during heating.

DETAILED DESCRIPTION OF THE EMBODIMENTS

The present inventors conducted intensive studies about the generation of odorous components during heating of modacrylic fibers that are produced by wet spinning a spinning solution in which a modacrylic polymer containing acrylonitrile, vinyl chloride and/or vinylidene chloride, and a sulfonic acid group-containing monomer is dissolved in dimethyl sulfoxide (DMSO). As a result, the present inventors found that, by making modacrylic fibers contain a condensed phosphate, the modacrylic fibers can have good texture and gloss, and reduce the generation of odorous components. Thus, the present inventors have reached one or more embodiments of the present invention. It is estimated that in the wet spinning of the spinning solution in which the modacrylic polymer is dissolved in dimethyl sulfoxide, a dehydrochlorination reaction of the modacrylic polymer occurs in the production process, and the dimethyl sulfoxide is decomposed by the generated hydrochloric acid, so that odorous components remain inside the fibers and/or on the surfaces the fibers. Moreover, in the curl setting with hot water or an iron, or crimping with a gear crimper of the modacrylic fibers, the dimethyl sulfoxide in the fibers is decomposed by heat, so that odorous components such as dimethyl sulfide and dimethyl disulfide are generated. The present inventors surprisingly found that, in one or more embodiments of the present invention, a condensed phosphate, which is generally used as a pH adjuster or a sequestering agent, can reduce the generation of odorous components such as dimethyl sulfide and dimethyl disulfide during heating when it is contained in modacrylic fibers made from the modacrylic polymer prepared by copolymerizing acrylonitrile, vinyl chloride and/or vinylidene chloride, and a sulfonic acid group-containing monomer. The mechanism that the modacrylic fibers containing the condensed phosphate can reduce the generation of foul odor during heating is still unclear, but it is estimated that the hydrochloric acid (hydrogen ion) generated by the dehydrochlorination reaction of the modacrylic polymer is used for an equilibrium reaction with a phosphate group derived from the condensed phosphate. Thus, the decomposition of DMSO by the hydrochloric acid is prevented.

In one or more embodiments, the modacrylic polymer contains 29.5 to 79.5% by mass of acrylonitrile, 20 to 70% by mass of vinyl chloride and/or vinylidene chloride, and 0.5 to 5% by mass of a sulfonic acid group-containing vinyl monomer with respect to the total mass of the modacrylic polymer. In other words, the modacrylic polymer is obtained by polymerizing a total of 100% by mass of a monomer mixture containing 29.5 to 79.5% by mass of acrylonitrile, 20 to 70% by mass of vinyl chloride and/or vinylidene chloride, and 0.5 to 5% by mass of a sulfonic acid group-containing vinyl monomer. When the content of acrylonitrile in the modacrylic polymer is 29.5 to 79.5% by mass, the heat resistance is improved. When the content of vinyl chloride and/or vinylidene chloride in the modacrylic polymer is 20 to 70% by mass, the flame resistance is improved. When the modacrylic polymer contains 0.5 to 5% by mass of a sulfonic acid group-containing vinyl monomer, the hydrophilicity is increased. Preferably, the modacrylic polymer contains 34.5 to 74.5% by mass of acrylonitrile, 25 to 65% by mass of vinyl chloride and/or vinylidene chloride, and 0.5 to 5% by mass of a sulfonic acid group-containing vinyl monomer with respect to the total mass of the modacrylic polymer. More preferably, the modacrylic polymer contains 39.5 to 74.5% by mass of acrylonitrile, 25 to 60% by mass of vinyl chloride, and 0.5 to 5% by mass of a sulfonic acid group-containing vinyl monomer with respect to the total mass of the modacrylic polymer. The modacrylic polymer preferably contains vinyl chloride from the viewpoint of excellent texture.

The sulfonic acid group-containing vinyl monomer is not particularly limited. Examples of the sulfonic acid group-containing vinyl monomer include allylsulfonic acid, methallylsulfonic acid, styrenesulfonic acid, isoprenesulfonic acid, 2-acrylamido-2-methylpropanesulfonic acid, and metal salts such as sodium salts thereof and amine salts thereof. These sulfonic acid group-containing vinyl monomers may be used individually or in combination of two or more.

In one or more embodiments, the modacrylic fibers for artificial hair contain a condensed phosphate in an amount of 0.05% by mass or more, preferably 0.1% by mass or more, and more preferably 0.15% by mass or more, from the viewpoint of effectively reducing the generation of odorous components. Moreover, the modacrylic fibers for artificial hair contain a condensed phosphate in an amount of 0.57% by mass or less, preferably 0.55% by mass or less, and more preferably 0.50% by mass or less, from the viewpoint of texture. The content of the condensed phosphate in the modacrylic fibers for artificial hair can be measured and calculated by ion chromatography. It is also possible to calculate the content of the condensed phosphate in the modacrylic fibers based on the content of phosphorus in the modacrylic fibers, if a specific substance name of the condensed phosphate contained in the modacrylic fibers is known beforehand. The content of phosphorus in the modacrylic fibers can be measured and calculated as described later.

In one or more embodiments, the modacrylic fibers for artificial hair contain phosphorus in an amount of preferably 0.0134% by mass or more, more preferably 0.026% by mass or more, further preferably 0.030% by mass or more, still further preferably 0.035% by mass or more, and even further preferably 0.040% by mass or more, from the viewpoint of effectively reducing the generation of odorous components. The modacrylic fibers for artificial hair contain phosphorus in an amount of preferably 0.150% by mass or less, more preferably 0.140% by mass or less, further preferably 0.135% by mass or less, and still further preferably 0.130% by mass or less, from the viewpoint of texture. The phosphorus said herein is derived from a condensed phosphate. The content of phosphorus in the modacrylic fibers can be measured and calculated as described later.

Any inorganic condensed phosphate can be used as the condensed phosphate. Examples of the inorganic condensed phosphate include pyrophosphate, tripolyphosphate, tetrapolyphosphate, trimetaphosphate, and tetrametaphosphate. In particular, tripolyphosphate is preferred from the viewpoint of availability and high water solubility. The type of salt is not particularly limited, and may be, e.g., sodium salt, potassium salt, or ammonium salt. Among them, water-soluble salts such as sodium salt and potassium salt are preferred from the viewpoint of their excellent solubility in water. The pyrophosphate (also referred to as diphosphate) may be, e.g., sodium pyrophosphate or potassium pyrophosphate. The tripolyphosphate may be, e.g., sodium tripolyphosphate, aluminum dihydrogentripolyphosphate, or potassium tripolyphosphate. The tetrapolyphosphate may be, e.g., sodium tetrapolyphosphate or potassium tetrapolyphosphate.

In one or more embodiments, the modacrylic fibers for artificial hair may also contain other additives as needed to modify the characteristics of fibers unless they interfere with the effects of one or more embodiments of the present invention. Examples of the additives include gloss control agents such as titanium dioxide, silicon dioxide, and esters and ethers of cellulose derivatives including cellulose acetate, coloring agents such as organic pigments, inorganic pigments, and dyes, and stabilizers for improving light resistance and heat resistance.

In one or more embodiments, when 0.02 g of the modacrylic fibers for artificial hair are placed in a 20 mL vial and heated at 140° C. for 5 minutes, the concentration of dimethyl sulfide generated in the vial is preferably 10 ppm or less and the concentration of dimethyl disulfide generated in the vial is preferably 5 ppm or less, because almost no odorous components are generated in the curl setting and crimping with a gear crimper of such modacrylic fibers. It is more preferred that the concentration of the dimethyl sulfide is 5.2 ppm or less and the concentration of the dimethyl disulfide is 1 ppm or less.

The modacrylic fibers for artificial hair of one or more embodiments can be produced by wet spinning a spinning solution in which the modacrylic polymer is dissolved in an organic solvent. The organic solvent is dimethyl sulfoxide. The use of dimethyl sulfoxide as the organic solvent improves safety. The spinning solution may contain a small amount of water, e.g., 1.5 to 4.8% by weight of water. Thereby, the formation of voids can be reduced.

In one or more embodiments, the wet spinning includes at least a coagulation process, a water washing process, and a drying process. The wet spinning preferably includes a bath drawing process to be performed before or after the water washing process and before the drying process. Further, the wet spinning preferably includes an oil application process to be performed before the drying process. Moreover, the wet spinning may further include a drawing process and a thermal relaxation process to be performed after the drying process. In the wet spinning, it is preferred that the condensed phosphate is applied to the modacrylic fibers after the water washing process and before the drying process, from the viewpoint of effectively reducing the generation of odorous components and improving the spinnability and the quality of fibers. Specifically, the condensed phosphate may be applied along with an oil to the modacrylic fibers after the water washing process and before the drying process, or may be applied to the modacrylic fibers before the oil application process or after the oil application process. In the wet spinning, it is preferred that the condensed phosphate is applied along with an oil to the modacrylic fibers during the oil application process, from the viewpoint of effectively reducing the generation of odorous components and improving the spinnability and the quality of fibers.

In one or more embodiments, the application of the condensed phosphate to the modacrylic fibers can be performed by a method in which an aqueous solution of the condensed phosphate is added to a spinning solution in which the modacrylic polymer is dissolved in dimethyl sulfoxide, or a method in which an aqueous solution of the condensed phosphate is mixed with dimethyl sulfoxide, and the modacrylic polymer is added to the mixture and dissolved therein by heating to prepare a spinning solution. However, when the condensed phosphate is contained in the spinning solution, most of the condensed phosphate is eluted into a coagulation bath, and the yield of the condensed phosphate in the modacrylic fibers is reduced. In order for the modacrylic fibers to contain 0.05% by mass or more of the condensed phosphate from the viewpoint of effectively reducing the generation of odorous components, a large amount of the condensed phosphate needs to be added to the spinning solution. This may lead to the instability in spinnability due to the generation of microvoids during coagulation, and the deterioration in the gloss and the texture of fibers. Therefore, the addition of a small amount of the condensed phosphate to the spinning solution and the application of the condensed phosphate to the modacrylic fibers after the water washing process and before the drying process may be performed in combination.

In the coagulation process of one or more embodiments, first, the spinning solution is extruded through a spinning nozzle into a coagulation bath containing an aqueous solution of dimethyl sulfoxide, where the extruded spinning solution is coagulated to form filaments (also referred to as "coagulated filaments"). For the coagulation bath, it is possible to use, e.g., an aqueous solution of dimethyl sulfoxide with a concentration of 40 to 70% by mass. The temperature of the coagulation bath may be 5 to 40° C. If the solvent concentration in the coagulation bath is too low, the coagulation is accelerated, and thus it is likely that a coagulation structure will be rough and voids will be formed inside the fibers.

Next, it is preferred that in the bath drawing process of some embodiments, the modacrylic fibers (coagulated filaments) is drawn in a drawing bath (also referred to as "primary drawing"). In one or more embodiments, the temperature of the drawing bath is preferably 30° C. or more, more preferably 40° C. or more, and further preferably 50° C. or more. The draw ratio is not particularly limited, and is preferably 2 to 8 times, more preferably 2 to 7 times, and further preferably 2 to 6 times from the viewpoint of improving the fiber strength and the productivity. When the primary drawing uses a water bath, the bath drawing process may be performed after the water washing process, as described below, or the primary drawing and water washing may be performed simultaneously.

Next, in the water washing process of one or more embodiments, the modacrylic fibers are washed with warm water at 30° C. or more to remove the dimethyl sulfoxide from the modacrylic fibers. The higher the temperature of the warm water, the easier the removal of the dimethyl sulfoxide. For example, warm water at 70° C. or more may be used. Further, the water washing process may be performed by passing the fibers through warm water using a bath, or by spraying warm water on the fibers in the air. Moreover, in the end or middle of the water washing process, the fibers may be pressed with nip rolls to squeeze the dimethyl sulfoxide out of the fibers, or the fibers may be sequentially washed with water several times using a bath and nip rolls arranged.

Generally, it is difficult in some embodiments to completely remove the dimethyl sulfoxide in the modacrylic fibers. Odorous components such as methyl sulfide and dimethyl disulfide contained in the modacrylic fibers tend to increase as the dimethyl sulfoxide remaining in the modacrylic fibers increases. The condensed phosphate has an effect of preventing an increase of such odorous components. In one or more embodiments of the present invention, the content of the dimethyl sulfoxide in the modacrylic fibers may be 0.01 to 1% by mass, or 0.01 to 0.5% by mass. In one or more embodiments of the present invention, the content of the dimethyl sulfoxide in the modacrylic fibers can be measured as described later.

The oil is not particularly limited, and any oil that is generally used in the production of fibers to prevent static electricity, adhesion between fibers, or to improve feeling, may be used. Examples of such oils include: anionic surfactants such as phosphates and sulfates; cationic surfactants such as quaternary ammonium salts and imidazolium salts; nonionic surfactants such as ethylene oxide adducts and/or propylene oxide adducts of fats and oils, and polyhydric alcohol partial esters; animal and vegetable fats and oils, mineral oils, and fatty acid esters; and silicone-based surfactants such as amino-modified silicones. These oils may be used individually or in combination of two or more. Generally, the oil is used in a state of being dissolved or dispersed in water (also called as "oil solution"). By adding a specific amount of the condensed phosphate to the oil solution to apply the condensed phosphate along with the oil to the modacrylic fibers, the modacrylic fibers can contain the condensed phosphate. Specifically, it is preferable to apply the condensed phosphate to the modacrylic fibers by dissolving a specific amount of the condensed phosphate together with the oil in an oil bath and immersing the water-washed yarns in the oil bath. The temperature of the oil bath is not particularly limited, and may be 40° or more, or 40 to 80° C. The immersion time is not particularly limited, and may be 1 to 10 seconds, or 1 to 5 seconds. The amount of the condensed phosphate to be added to the oil solution is not particularly limited, and may be determined appropriately based on the target content of the condensed phosphate in the modacrylic fibers. For example, the condensed phosphate may be added in an amount of 0.05 to 1.5 parts by mass, or 0.1 to 1.0 parts by mass, with respect to 100 parts by mass of the oil solution. The oil solution may include other function-imparting agents depending on the purpose. For example, dimethyl sulfone can improve curl setting properties of the modacrylic fibers with hot water.

Next, in the drying process of one or more embodiments, the modacrylic fibers to which the oil and the condensed phosphate have been applied are dried. The drying temperature is not particularly limited, and may be, e.g., 110 to 190° C., and preferably 110 to 160° C. Then, the dried fibers may further be drawn as needed (secondary drawing). The drawing temperature of the secondary drawing is not particularly limited, and may be, e.g., 110 to 190° C., and preferably 110 to 160° C. The draw ratio is not particularly limited, and is preferably, e.g., 1 to 4 times. The total draw ratio, including the bath drawing before the drying process, is preferably 2 to 12 times.

In one or more embodiments, the fibers that have been dried or the fibers that have been dried and then drawn are preferably relaxed in the thermal relaxation process. The relaxation rate is not particularly limited, and is preferably, e.g., 5% or more, and more preferably 10% or more. The thermal relaxation treatment can be performed in a dry heat atmosphere or a superheated steam atmosphere at a high temperature, e.g., at 150 to 200° C., preferably at. 150 to 190° C. Alternatively, the thermal relaxation treatment can be performed in a pressurized steam atmosphere or a heated and pressurized steam atmosphere at 120 to 180° C. under 0.05 to 0.4 MPa, preferably under 0.1 to 0.4 MPa.

In one or more embodiments of the present invention, the single fiber fineness of the modacrylic fibers is preferably 10 to 100 dtex, more preferably 20 to 95 dtex, further preferably 30 to 90 dtex, still further preferably 40 to 80 dtex, and even further preferably 45 to 70 dtex from the viewpoint of making the fibers suitable for artificial hair.

In one or more embodiments, the modacrylic fibers for artificial hair can be used to produce hair ornament products. The hair ornament products may include other fibers for artificial hair in addition to the above modacrylic fibers for artificial hair. The other fibers for artificial hair are not particularly limited, and may be, e.g., polyvinyl chloride fibers, nylon fibers, polyester fibers, or regenerated collagen fibers.

The hair ornament products may include, e.g., fiber bundles for hair, weaves, wigs, braids, toupee, hair extensions, and hair accessories.

EXAMPLES

Hereinafter, one or more embodiments of the present invention will be described by way of examples. However, the present invention is not limited to the following examples.

Example 1

A modacrylic polymer containing 46% by mass of acrylonitrile, 52% by mass of vinyl chloride, and 2% by mass of sodium styrenesulfonate was dissolved in dimethyl sulfoxide to form a solution having a resin concentration of 28.0% by mass. Next, 0.15 parts by mass of distilled water with respect to 100 parts by mass of the modacrylic polymer was added to the resin solution, to which 2.1 parts by mass of carbon black, 0.04 parts by mass of a red dye (C. I. Basic Red 46) and 0.07 parts by mass of a blue dye (C. I. Basic Blue 41) with respect to 100 parts by mass of the modacrylic polymer were added as coloring agents to prepare a spinning solution. The spinning solution was extruded through a spinning nozzle (hole diameter: 0.3 mm, the number of holes: 100) into a coagulation bath containing an aqueous solution of dimethyl sulfoxide with a concentration of 62% by mass at 20° C., where the extruded spinning solution was coagulated to form filaments. Then, the filaments were drawn to three times their original length in a drawing bath containing an aqueous solution of dimethyl sulfoxide with a concentration of 50% by mass at 80° C. Subsequently, the drawn yarns were washed with warm water at 90° C. Next, the water-washed primary drawn yarns were immersed for 1 to 3 seconds in an oil bath (60° C.) to which a mixture of oil (including a fatty acid ester oil and a polyoxyethylene surfactant), distilled water and sodium tripolyphosphate was introduced. Thus, the drawn yarns were impregnated with the mixture of oil and sodium tripolyphosphate. Thereafter, the drawn yarns were dried by uniform hot air at 140° C. and a heated roll at 160° C. in sequence, and further drawn to two times in a dry heat atmosphere at 130° C. The resulting yarns were subjected to a 20% relaxation treatment in a dry heat atmosphere at 154° C. to provide modacrylic fibers having a single fiber fineness of about 46 dtex. In the oil bath, the amount of sodium tripolyphosphate added was 0.1 parts by mass with respect to 100 parts by mass of the oil solution (i.e., total mass of the fatty acid ester oil, polyoxyethylene surfactant, and distilled water).

Example 2

Modacrylic fibers of Example 2 having a single fiber fineness of about 46 dtex were obtained in the same manner as in Example 1, except that sodium tripolyphosphate was added in an amount of 0.3 parts by mass with respect to 100 parts by mass of the oil solution.

Example 3

Modacrylic fibers of Example 3 having a single fiber fineness of about 46 dtex were obtained in the same manner as in Example 1, except that sodium tripolyphosphate was added in an amount of 1.0 part by mass with respect to 100 parts by mass of the oil solution.

Example 4

Modacrylic fibers of Example 4 having a single fiber fineness of about 46 dtex were obtained in the same manner as in Example 1, except that sodium pyrophosphate was added in an amount of 0.3 parts by mass with respect to 100 parts by mass of the oil solution.

Example 5

A spinning solution of Example 5 was prepared in the same manner as in Example 1, except that an aqueous solution of sodium tripolyphosphate with a concentration of 1.22% by mass was added to the resin solution instead of distilled water so that the amount of the sodium tripolyphosphate would be 0.15 parts by mass with respect to 100 parts by mass of the modacrylic polymer. Modacrylic fibers of Example 5 having a single fiber fineness of about 46 dtex were obtained in the same manner as in Example 1, except that the above spinning solution was used, and a mixture of the oil solution and sodium tripolyphosphate, prepared by adding 0.3 parts by mass of sodium tripolyphosphate with respect to 100 parts by mass of the oil solution, was introduced into the oil bath.

Example 6

A spinning solution of Example 6 was prepared in the same manner as in Example 1, except that an aqueous solution of sodium tripolyphosphate with a concentration of 1.22% by mass was added to the resin solution instead of distilled water so that the amount of the sodium tripolyphosphate would be 0.05 parts by mass with respect to 100 parts by mass of the modacrylic polymer. Modacrylic fibers of Example 6 having a single fiber fineness of about 46 dtex were obtained in the same manner as in Example 1, except that the above spinning solution was used, and a mixture of the oil solution and sodium tripolyphosphate, prepared by adding 1.0 part by mass of sodium tripolyphosphate with respect to 100 parts by mass of the oil solution, was introduced into the oil bath.

Comparative Example 1

Modacrylic fibers of Comparative Example 1 having a single fiber fineness of about 46 dtex were obtained in the same manner as in Example 1, except that sodium tripolyphosphate was not added to the oil solution.

Comparative Example 2

Modacrylic fibers of Comparative Example 2 having a single fiber fineness of about 46 dtex were obtained in the same manner as in Example 5, except that sodium tripolyphosphate was not added to the oil solution.

Comparative Example 3

Modacrylic fibers of Comparative Example 3 having a single fiber fineness of about 46 dtex were obtained in the same manner as in Example 1, except that sodium tripolyphosphate was added in an amount of 1.25 parts by mass with respect to 100 parts by mass of the oil solution.

Comparative Example 4

A spinning solution of Comparative Example 4 was prepared in the same manner as in Example 1, except that an aqueous solution of sodium tripolyphosphate with a concentration of 3.66% by mass was added to the resin solution instead of distilled water so that the amount of the sodium tripolyphosphate would be 0.46 parts by mass with respect to 100 parts by mass of the modacrylic polymer. Modacrylic fibers of Comparative Example 4 having a single fiber fineness of about 46 dtex were obtained in the same manner as in Example 1, except that the above spinning solution was used, and sodium tripolyphosphate was not added to the oil solution.

The content of phosphorus and the content of the condensed phosphate in the modacrylic fibers of Examples 1 to 6 and Comparative Examples 1 to 4 were measured and calculated as described below. The generation of foul odor during the heating of the modacrylic fibers of Examples 1 to 6 and Comparative Examples 1 to 4 was evaluated by performing a heat test in which the concentrations of the generated dimethyl sulfide and dimethyl disulfide were measured, as described below. Moreover, the texture and gloss of the modacrylic fibers of Examples 1 to 6 and Comparative Examples 1 to 4 were evaluated as described below. Table 1 below shows the results.

(Content of Phosphorus and Content of Condensed Phosphate in Modacrylic Fibers)

Sulfuric acid, nitric acid, hydrofluoric acid, and perchloric acid were added to fibers that were cut into a length of 0.5 cm, and the fibers were decomposed by heating at 120° C. in reflux conditions. After the resulting mixture was condensed by heating until sulfuric acid produced white smoke, the condensate was dissolved by warming with diluted nitric acid at 100° C. for 45 minutes, and calibrated to a certain volume. The obtained liquid with the certain volume was used to quantify the phosphorus element with an ICP emission spectrophotometer ("SPS4000" manufactured by Seiko Instruments Inc.). The content of the condensed phosphate was calculated based on the content of phosphorus.

(Content of Dimethyl Sulfoxide in Modacrylic Fibers)

A glass sample bottle containing pure water was prepared, in which fibers were placed so that the water would not overflow. Then, the fibers were left to stand for 2 hours or more in hot water at 95° C. or more to extract the dimethyl sulfoxide in the fibers. The extract was analyzed by gas chromatography to calculate the mass (W1) of the dimethyl sulfoxide in the fibers. The fibers in the glass sample bottle were washed with pure water, and then dried at 110° C. for 4 hours or more to calculate the mass (W2) of the dried fibers. Using the following formula, the content of the dimethyl sulfoxide in the modacrylic fibers was calculated.

Content of dimethyl sulfoxide in modacrylic fibers (% by mass)=($W1$)/($W2$+$W1$)×100

(Method for Evaluating Foul Odor)

0.02 g of fibers were placed in a 20 mL vial and heated at 140° C. for 5 minutes. Then, 0.2 mL of a headspace gas phase was directly introduced with a gas tight syringe, and GC/MS ("QP-2010 PLUS" manufactured by Shimadzu Corporation) was used to quantify dimethyl sulfide (also referred to as "DMS" in the following) and dimethyl disulfide (also referred to as "DMDS" in the following). Based on the concentrations of the quantified dimethyl sulfide and dimethyl disulfide, the generation of a foul odor was evaluated in accordance with the following criteria.

A: The concentration of the dimethyl sulfide is 10 ppm or less, and the concentration of the dimethyl disulfide is 5 ppm or less, so that almost no foul odor is generated.

B: The concentration of the dimethyl sulfide is more than 10 ppm, and/or the concentration of the dimethyl disulfide is more than 5 ppm, so that a foul odor is generated.

(Method for Evaluating Texture)

The sensory evaluation was performed to evaluate the texture of fibers using a fiber bundle (sample) having a total fineness of 1,200,000 to 1,300,000 dtex, by three persons involved in the evaluation of the beauty of hairpieces for three or more years. The fiber bundle evaluated as having a texture equivalent to that of a hair ornament product AFRELLE (modacrylic fibers manufactured by Kaneka Corporation) by all of the evaluators was judged as "good". The fiber bundle evaluated as not having an equivalent texture by any or all of the evaluators was judged as "poor".

(Method for Evaluating Gloss)

The visual evaluation was performed to evaluate the gloss of fibers using a fiber bundle (sample) having a total fineness of 1,200,000 to 1,300,000 dtex, by three persons involved in the evaluation of the beauty of hairpieces for three or more years. The fiber bundle evaluated as having a gloss equivalent to that of a hair ornament product AFRELLE (modacrylic fibers manufactured by Kaneka Corporation) by all of the evaluators was judged as "good". The fiber bundle evaluated as having dullness and not having an equivalent gloss by any or all of the evaluators was judged as "poor".

(Overall Judgement)

Pass: Fibers satisfying all of the following: the concentration of dimethyl sulfide generated was 10 ppm or less, the concentration of dimethyl disulfide generated was 5 ppm or less, the texture was good, and the gloss was good.

Fail: Fibers falling under any of the following: the concentration of dimethyl sulfide generated exceeded 10 ppm, the concentration of dimethyl disulfide generated exceeded 5 ppm, the texture was poor, or the gloss was poor.

TABLE 1

| | Content in modacrylic fibers (mass %) | | | Concentration of odorous components generated (ppm) | | | | |
|---|---|---|---|---|---|---|---|---|
| | Content of phosphorus | Content of condensed phosphate | Content of DMSO | Dimethyl sulfide | Dimethyl disulfide | Texture | Gloss | Overall Judgement |
| Ex. 1 | 0.0134 | 0.05 | 0.18 | 5.5 | 1.2 | Good | Good | Pass |
| Ex. 2 | 0.0362 | 0.14 | 0.22 | 4.8 | 0.8 | Good | Good | Pass |
| Ex. 3 | 0.123 | 0.48 | 0.29 | 0.4 | <0.1 | Good | Good | Pass |
| Ex. 4 | 0.0335 | 0.14 | 0.21 | 5.1 | 1.0 | Good | Good | Pass |
| Ex. 5 | 0.041 | 0.16 | 0.21 | 3.0 | 0.5 | Good | Good | Pass |
| Ex. 6 | 0.125 | 0.49 | 0.23 | 0.2 | <0.1 | Good | Good | Pass |
| Comp. Ex. 1 | 0 | 0 | 0.12 | 13.0 | 5.1 | Good | Good | Fail |
| Comp. Ex. 2 | 0.0052 | 0.02 | 0.18 | 23.0 | 6.0 | Good | Good | Fail |
| Comp. Ex. 3 | 0.1515 | 0.60 | 0.20 | <0.1 | <0.1 | Poor | Good | Fail |
| Comp. Ex. 4 | 0.0074 | 0.03 | 0.19 | 26.0 | 6.0 | Poor | Poor | Fail |

* Ex.: Example, Comp. Ex.: Comparative Example

As can be seen from the results in Table 1 above, the modacrylic fibers of Examples 1 to 6, containing the condensed phosphate in an amount of 0.05 to 0.57% by mass, had good texture and gloss. Moreover, the heat tests on the modacrylic fibers of Examples 1 to 6 showed that the concentration of the dimethyl sulfide was 10 ppm or less and the concentration of the dimethyl disulfide was 5 ppm or less, and thus almost no odorous components were generated.

The modacrylic fibers of Comparative Example 1, not containing the condensed phosphate, and the modacrylic fibers of Comparative Example 2, containing the condensed phosphate in an amount of less than 0.05% by mass, had good texture and gloss. However, the heat tests on the modacrylic fibers of Comparative Examples 1 and 2 showed that the concentration of the dimethyl sulfide exceeded 10 ppm and the concentration of the dimethyl disulfide exceeded 5 ppm, and thus odorous components were generated. The modacrylic fibers of Comparative Example 3, containing the condensed phosphate in an amount exceeding 0.57% by mass, hardly generated odorous compounds in the heat test, but had poor texture and failed in the overall judgment. The heat test on the modacrylic fibers of Comparative Example 4, containing the condensed phosphate in an amount of less than 0.05% by mass, showed that the concentration of the dimethyl sulfide exceeded 10 ppm and the concentration of the dimethyl disulfide exceeded 5 ppm, and thus odorous components were generated. Moreover, in Comparative Example 4, since a large amount of the condensed phosphate was added to the spinning solution and then the spinning was performed, the coagulation became uneven, and microvoids were created in the water-washed yarns. The microvoids collapsed in the drying process and the thermal relaxation process, and the fiber surfaces became uneven. Therefore, the modacrylic fibers of Comparative Example 4 had poor texture and poor gloss.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. Modacrylic fibers for artificial hair, comprising:
   a modacrylic polymer; and
   a condensed phosphate,
   wherein the modacrylic polymer comprises 29.5 to 79.5% by mass of acrylonitrile, 20 to 70% by mass of vinyl chloride and/or vinylidene chloride, and 0.5 to 5% by mass of a sulfonic acid group-containing vinyl monomer, with respect to a total mass of the modacrylic polymer, and
   wherein a content of the condensed phosphate in the modacrylic fibers is 0.05 to 0.57% by mass.

2. The modacrylic fibers according to claim 1, wherein a content of phosphorus in the modacrylic fibers is 0.0134 to 0.150% by mass.

3. The modacrylic fibers according to claim 1, wherein the condensed phosphate is at least one compound selected from the group consisting of pyrophosphate, tripolyphosphate, tetrapolyphosphate, trimetaphosphate, and tetrametaphosphate.

4. The modacrylic fibers according to claim 3, wherein the condensed phosphate is tripolyphosphate.

5. The modacrylic fibers according to claim 1, wherein when 0.02 g of the modacrylic fibers are placed in a 20 mL vial and heated at 140° C. for 5 minutes, a concentration of dimethyl sulfide generated in the vial is 10 ppm or less, and a concentration of dimethyl disulfide generated in the vial is 5 ppm or less.

6. A method for producing modacrylic fibers for artificial hair, the method comprising:
preparing a spinning solution by dissolving a modacrylic polymer in an organic solvent; and
wet spinning the spinning solution,
wherein the modacrylic polymer comprises 29.5 to 79.5% by mass of acrylonitrile, 20 to 70% by mass of vinyl chloride and/or vinylidene chloride, and 0.5 to 5% by mass of a sulfonic acid group-containing vinyl monomer, with respect to a total mass of the modacrylic polymer,
wherein the organic solvent is dimethyl sulfoxide, and
wherein the wet spinning comprises at least a coagulation process, a water washing process, and a drying process, and
wherein a condensed phosphate is applied to the modacrylic fibers after the water washing process and before the drying process so as to obtain the modacrylic fibers comprising 0.05 to 0.57% by mass of the condensed phosphate.

7. The method according to claim 6, wherein the condensed phosphate is applied with an oil to the modacrylic fibers.

8. The method according to claim 7, wherein a content of phosphorus in the modacrylic fibers is 0.0134 to 0.150% by mass.

9. The method according to claim 7, wherein the condensed phosphate is at least one compound selected from the group consisting of pyrophosphate, tripolyphosphate, tetrapolyphosphate, trimetaphosphate, and tetrametaphosphate.

10. The method according to claim 9, wherein the condensed phosphate is tripolyphosphate.

11. The method according to claim 6, wherein a content of phosphorus in the modacrylic fibers is 0.0134 to 0.150% by mass.

12. The method according to claim 6, wherein the condensed phosphate is at least one compound selected from the group consisting of pyrophosphate, tripolyphosphate, tetrapolyphosphate, trimetaphosphate, and tetrametaphosphate.

13. The method according to claim 12, wherein the condensed phosphate is tripolyphosphate.

14. A hair ornament product comprising modacrylic fibers for artificial hair, the modacrylic fibers comprising:
a modacrylic polymer; and
a condensed phosphate,
wherein the modacrylic polymer comprises 29.5 to 79.5% by mass of acrylonitrile, 20 to 70% by mass of vinyl chloride and/or vinylidene chloride, and 0.5 to 5% by mass of a sulfonic acid group-containing vinyl monomer, with respect to a total mass of the modacrylic polymer, and
wherein a content of the condensed phosphate in the modacrylic fibers is 0.05 to 0.57% by mass.

15. The hair ornament product according to claim 14, wherein a content of phosphorus in the modacrylic fibers is 0.0134 to 0.150% by mass.

16. The hair ornament product according to claim 14, wherein the condensed phosphate is at least one compound selected from the group consisting of pyrophosphate, tripolyphosphate, tetrapolyphosphate, trimetaphosphate, and tetrametaphosphate.

17. The hair ornament product according to claim 14, wherein the condensed phosphate is tripolyphosphate.

18. The hair ornament product according to claim 14, wherein when 0.02 g of the modacrylic fibers are placed in a 20 mL vial and heated at 140° C. for 5 minutes, a concentration of dimethyl sulfide generated in the vial is 10 ppm or less, and a concentration of dimethyl disulfide generated in the vial is 5 ppm or less.

19. The hair ornament product according to claim 14, wherein the hair ornament product is at least one selected from the group consisting of a fiber bundle for hair, a weave, a wig, a braid, toupee, a hair extension, and a hair accessory.

* * * * *